United States Patent
Chen et al.

(10) Patent No.: US 10,502,578 B2
(45) Date of Patent: Dec. 10, 2019

(54) METHODS AND SYSTEMS FOR EFFICIENT AND TIMELY TRANSPORTATION OF HEAVY-DUTY TRUCKS

(71) Applicant: The Chinese University of Hong Kong, Shatin, N.T., Hong Kong SAR (CN)

(72) Inventors: Minghua Chen, Sanya (CN); Lei Deng, Pingxiang (CN); Mohammad Hassan Hajiesmail, Tehran (IR)

(73) Assignee: The Chinese University of Hong Kong, Shatin (CN)

( * ) Notice: Subject to any disclaimer, the term of this patent is extended or adjusted under 35 U.S.C. 154(b) by 182 days.

(21) Appl. No.: 15/622,743

(22) Filed: Jun. 14, 2017

(65) Prior Publication Data
US 2018/0364061 A1 Dec. 20, 2018

(51) Int. Cl.
G01C 21/34 (2006.01)
G01C 21/36 (2006.01)
G06Q 10/04 (2012.01)

(52) U.S. Cl.
CPC ..... *G01C 21/3469* (2013.01); *G01C 21/3453* (2013.01); *G01C 21/3605* (2013.01); *G06Q 10/047* (2013.01)

(58) Field of Classification Search
CPC ............ G01C 21/3469; G01C 21/3605; G01C 21/3453; G06Q 10/047
USPC ......................................................... 701/410
See application file for complete search history.

(56) References Cited

U.S. PATENT DOCUMENTS

2015/0285651 A1* 10/2015 Cerecke ............. G01C 21/3446
701/533

OTHER PUBLICATIONS

Ahn, "Microscopic Fuel Consumption and Emission Modeling," Dec. 5, 1998, 141 pages.
Al Alam, et al., "An Experimental Study on the Fuel Reduction Potential of Heavy Duty Vehicle Platooning," 2010 13th International IEEE, Annual Conference on Intelligent Transportation Systems, Madeira Islands, Portugal, Sep. 19-22, 2010, 6 pages.
"Amazon.com Help: Place an Order with Guaranteed Delivery," www.amazon.com/gp/help/display.html?nodeId=201117390, retrieved Jun. 21, 2017, 3 pages.
(Continued)

*Primary Examiner* — Brian P Sweeney
(74) *Attorney, Agent, or Firm* — Kilpatrick Townsend & Stockton LLP

(57) ABSTRACT

Optimal routes and speeds for a heavy-duty truck traversing a network of roads can be automatically determined so as to minimize fuel costs (and optionally other operating costs) while still making on-time delivery of freight to a destination. Route and speed optimization can be based on a network model in which edges correspond to road segments and each edge has an associated cost function that reflects fuel consumption for a truck traversing the corresponding road segment. Given a starting location, destination location, delivery deadline, and truck information, an efficient search algorithm can be executed by a computer to determine an optimal path and speed through the network model, subject to the constraint of arriving at the destination by the delivery deadline. A truck operator can follow the route to the destination, driving at the optimal speed.

17 Claims, 9 Drawing Sheets

(56) References Cited

OTHER PUBLICATIONS

An et al., "Model of Fuel Economy with Applications to Driving Cycles and Traffic Management," Transportation Research Record 1416, (1993), 105-114.
Ardekani et al., "Traffic Impact Models," Chapter 7 in Traffic Flow Theory, Oak Bridge National Laboratory Report (1992), 26 pages.
Ashby, "Protecting Perishable Foods During Transport by Truck," USDA Agricultural Marketing Service, Handbook 669, Sep. 1995 (Reprinted Jul. 2006), 100 pages.
Berry, "The Effects of Driving Style and Vehicle Performance on the Real-World Fuel Consumption of U.S. Light-Duty Vehicles," 2010 Massachusetts Institute of Technology, 2010, 140 pages.
Brooker et al., "Advisor Documentation—Advanced Vehicle Simulator," National Renewable Energy Laboratory, Oct. 10, 2003 [Version 2003], 3 pages.
Caltrans, "Special Route Restrictions," Aug. 6, 2009, www.dot.ca.gov/trafficops/trucks/restrict-list.html, retrieved Jun. 21, 2017, 9 pages.
Clinched Highway Mapping, http://cmap.m-plex.com/index.php, retrieved Jun. 21, 2017, 2 pages.
Davis et al., "Transportation Energy Data Book, Edition 34," Aug. 2015, 440 pages.
Demir et al., "A Review of Recent Research on Green Road Freight Transportation," European Journal of operational Research, 237, (2014), 775-793.
Demir et al., "A Comparative Analysis of Several Vehicle Emission Models for Road Freight Transportation," Transportation Research Part D, 16, (2011), 347-357.
Deng, et al., "Energy-Efficient Timely Transportation of Long-Haul Heavy-Duty Trucks," In Proceedings of the Seventh International Conference on Future Energy Systems, p. 10. ACM, 2016.
Garthwaite, "Smarter Trucking Saves Fuel Over the Long Haul," National Geographic News, Sep. 24, 2011, http://news.nationalgeographic.com/news/energy/2011/9/110923-fuel-economy-for-trucks.html, 12 pages.
Harrington, et al., "Improving Fuel Economy in Heavy-Duty Vehicles," (2012), 39 pages.
Hellström, et al., "Look-Ahead Control for Heavy Trucks to Minimize Trip Time and Fuel Consumption," Control Engineering Practice 17, (2009), 245-254.
Hellström, et al., "Design of an Efficient Algorithm for Fuel-Optimal Look-Ahead Control," Control Engineering Practice 18 (2010) 1318-1327.
Jüttner, et al., "Lagrange Relaxation Based Methods for the QoS Routing Problem," In INFOCOM 2001. Twentieth Annual Joint Conference of the IEEE Computer and Communications Societies. Proceedings. IEEE, vol. 2, pp. 859-868. IEEE, 2001.
Larson et al., A Distributed Framework for Coordinated Heavy-Duty Vehicle Platooning, IEEE Transactions on Intelligent Transportation Systems 16, No. 1 (2015): 419-429.
Leskovec, "Snap System," Stanford University, http://snap.stanford.edu/snap, retrieved Jun. 21, 2017, 2 pages.
Markel et al., "Advisor: A Systems Analysis Tool for Advanced Vehicle Modeling," Journal of Power Sources, 110 (2002), 255-266.
Mohamed-Kassim et al., "Fuel Savings on a Heavy Vehicle via Aerodynamic Drag Reduction," Transportation Research Part D, 15, (2010), 275-284.

Nam, et al., "Fuel Consumption Modeling of Conventional and Advanced Technology Vehicles in the Physical Emission Rate Estimator (PERE)." US Environmental Protection Agency (2005), 124 pages.
Stodolsky et al., "Analysis of Technology Options to Reduce the Fuel Consumption of Idling Trucks," Center for Transportation Research, Energy Systems Division, Jun. 2000, 40 pages.
Suzuki, "A New Truck-Routing Approach for Reducing Fuel Cinsumption and Pollutants Emission," Transportation Research Part D, 16, (2011), 73-77.
"About Fatigue Management," NHVR National Heavy Vehicle Regulator, http://www.hhvr.gov.au/saftey-acreditation-compliance-fatigue-management/about-fatigue-management, retrieved Jun. 21, 2017, 3 pages.
Brochure, "Kenworth T800 The Ultimate Workhorse," Kenworth Trucks—The World's Best, http://www.kenworth.com/trucks/t800, retrieved Jun. 21, 2017, 3 pages.
"Estimating Truck-Related Fuel Consumption and Emissions in Maine: A Comparative Analysis for a 6-axle, 100,000 Pound Vehicle Configuration," American Transportation Research Institute (ATRI), Sep. 2009, 45 pages.
"Freight Performance Measurement: Travel Time in Freight-Significant Corridors," U.S. Department of Transportation Federal Highway Administration, Dec. 2009, 44 pages.
"Fuel Economy at Various Driving Speeds," Oak Ridge National Laboratory, Transportation Energy Data Book #35, Table 4.27, https://www.afdc.energy.gov/data/10312, (Jan. 2017) retrieved Jun. 2017, 1 page.
"Gas Mileage Tips—Keeping Your Vehicle in Shape," https://www.fueleconomy.gov/feg/maintain.jsp, retrieved Jun. 21, 2017, 3 pages.
"Hours of Service." Wikipedia, https://en.wikipedia.org/wiki/Hours_of_service, retrieved Jun. 21, 2017, 13 pages.
"Improving the Fuel Efficiency of American Trucks—Bolstering Energy Security, Cutting Carbon pollution, Saving Money and Manufacturing Innovation," The White House, Feb. 2014, 9 pages.
"The National Map—Elevation Point Query Service,"USGS, http://www.usgs.gov/accessibility.html, retrieved Jun. 21, 2017, 2 pages.
"New York—State Energy Profile Overview," U.S. Energy Information Administration (EIA), www.eia.gov/state/?sid=NY#tabs-2, retrieved Jun. 21, 2017, 6 pages.
"Super Truck Team Achieves 115% Freight Efficiency Improvement in Class 8 Long-Haul Truck," Office of Energy Efficiency & Renewable Energy, Apr. 2, 2015, https://energy.gov/eere/vehicles/articles/supertruck-team-achieves-115-freight-efficiency-improvement-class-8-long-haul, 4 pages.
"Traffic Flow Using Corridor, Request Traffic Flow for a Defined Route," API Playground—Here Developers/REST APIs—Traffic—Traffic Flow Coordinator, https://developer.here.com/api-explorer/rest/traffic/flow-using-corridor, retrieved Jun. 21, 2017, 3 pages.
"Transportation Logistics Enhances Your business Efficiency," Ready Trucking Inc., Ready Trucking Blog, Aug. 1, 2014, http://www.readytrucking.com/transportation-logistics-business-efficiency/, retrieved Jun. 21, 2017, 6 pages.
"Transportation Overview," Center for Climate and Energy Solutions, https://www.c2es.org/energy/use/transportation, retrieved Jun. 21, 2017, 10 pages.
http://courses.teresco.org/chm/graphics/usa-national.gra, retrieved Jun. 21, 2017, 423 pages.

* cited by examiner

| Road Network | | | Input | | Fuel (gallons) | | Time (s) | | Memory (GB) | |
|---|---|---|---|---|---|---|---|---|---|---|
| | Reg. | n | m | Instance | ε | Heuristic | FPTAS | Heuristic | FPTAS | Heuristic | FPTAS |
| S1 | 1&2 | 1185 | 2568 | (1,2,8) | 0.1 | 74.811 | 74.812 | 1 | 50 | 0.29 | 2.73 |
| S2 | 17&18 | 3274 | 7465 | (18,17,10) | 0.1 | 60.2795 | 60.2798 | 2 | 3511 | 0.29 | 14.76 |
| S3 | 1-22 | 38213 | 82781 | (4,22,40) | 0.1 | 290.744 | - | 365 | - | 0.29 | - |
| S4 | 1&2 | 1185 | 2568 | (1,2,8) | 0.05 | 74.811 | 74.812 | 1 | 126 | 0.29 | 6.84 |

*FIG. 8*

|  | Average Time Increase (%) | Average Distance Increase (%) | Average Fuel Increase (%) | Average Fuel Economy (mpg) |
|---|---|---|---|---|
| (i) Fastest time/max speed | - | 1.71 | 20.14 | 5.05 |
| (ii) Fastest time/opt speed | 32.80 | 1.71 | 2.00 | 5.94 |
| (iii) Shortest path/max speed | 2.82 | - | 16.40 | 5.13 |
| (iv) Shortest path/opt speed | 32.8 | - | 0.31 | 5.94 |
| Heuristic PASO (LB) | 32.95 | 0.17 | - | 5.96 |
| Heuristic PASO (UB) | 32.89 | 0.18 | 0.02 | 5.96 |

FIG. 9

METHODS AND SYSTEMS FOR EFFICIENT AND TIMELY TRANSPORTATION OF HEAVY-DUTY TRUCKS

BACKGROUND

This disclosure relates generally to transportation of freight and in particular to the efficient and timely routing of heavy-duty trucks through a network of roads.

In the U.S., heavy-duty trucks haul more than 70% of all freight tonnage. They consume 17.6% of the energy used in the transportation sector and contribute about 5% of total greenhouse gas emissions. Fuel cost is the largest operating cost incurred by truck operators, and reducing fuel consumption is critical for cost-effective and environmentally-friendly heavy-duty truck operations.

Apart from fuel cost, timely delivery is another critical issue for truck operators. Unexpected delays can increase freight cost by 50% to 250%. Multiple factors contribute to the importance of timely delivery. For instance, some freight goods, such as food, are perishable and may become worthless if not timely delivered. As another example, to ensure customers' satisfaction, some shippers, e.g., Amazon, may have a service-level agreement (SLA) with customers, under which a delivery date is guaranteed; late deliveries directly cost the company money. In addition, even in the absence of a guarantee, late deliveries may be detrimental to customer relationships. Moreover, failing to deliver as scheduled may introduce difficulties for global logistics and may increase the uncertainty and inefficiency of supply chains.

Efforts have been made to make heavy-duty trucks more fuel efficient. Examples include improvements to designs for engines, drivetrains, aerodynamics, and tires, as well as improved maintenance procedures such as maintaining optimal tire pressure. However, outside of these physical design and maintenance changes, there is an opportunity to increase efficiency by optimizing heavy-duty truck operations.

SUMMARY

Certain embodiments of the present invention relate to methods and systems for determining optimal routes and speeds for a heavy-duty truck traversing a network of roads. An optimal route and optimal speed for various portions of the route can be automatically determined so as to minimize fuel costs (and optionally other operating costs) while still making on-time delivery of freight to a destination.

In some embodiments, a road system (e.g., a system of interconnected highways) can be modeled as a network consisting of a number of nodes connected by edges. Each node can correspond to a junction of roads, an endpoint of a road, or some other location of interest (which may be served by one or more roads). The edges correspond to road segments. Each edge can have an associated cost function, with the cost depending at least in part on fuel consumption for the truck traversing the edge. Edges may be defined directionally, so that the cost associated with traversing a route depends on the direction of travel. Fuel consumption may be defined as a function that depends on the nature of the corresponding highway segment (e.g., road surface, average grade, etc.), the speed of travel, fuel consumption characteristics of a particular truck, and the weight of the cargo. Given a starting location, destination location, deadline for delivery, truck information, and weight, an efficient search algorithm can be executed by a computer to determine an optimal path and speed through the network model, subject to the constraint of arriving at the destination by the delivery deadline. The optimal route and speed can be provided to a user, such as a truck driver, who can follow the route to the destination, driving at the optimal speed. Using these techniques, freight can be timely and efficiently delivered to a destination.

The following detailed description, together with the accompanying drawings, will provide a better understanding of the nature and advantages of the present invention.

BRIEF DESCRIPTION OF THE DRAWINGS

FIG. 8 is a table showing representative results from testing of a heuristic algorithm according to an embodiment of the present invention.

FIG. 9 is a table showing the average effect of different route-selection algorithms including a heuristic algorithm according to an embodiment of the present invention.

DETAILED DESCRIPTION

Certain embodiments of the present invention relate to methods and systems for determining optimal routes and speeds for a heavy-duty truck traversing a network of roads. An optimal route and optimal speed for various portions of the route can be automatically determined so as to minimize fuel costs (and optionally other operating costs) while still making on-time delivery of freight to a destination.

Optimal planning of routes and speeds for freight shipping can have a number of benefits. For example, different routes can have different distances, levels of congestion, road grades, and surface types, all of which can greatly affect fuel consumption. Real-world studies show that choosing a more efficient route for a heavy-duty truck can improve its fuel economy by 21%. Speed planning is another approach to reducing fuel consumption. As a rule of thumb for highway truck operations, every mile per hour (mph) increase in speed incurs about a 0.14 mile per gallon (mpg) penalty in fuel economy. However, operating at low speeds may result in excessive travel time and late delivery of goods, which is also critical as delays can increase freight cost by 50% to 250%. Thus, optimal planning of rotes and speeds can involve tradeoffs: faster speeds reduce delivery delays, but at the price of increased fuel consumption. Some embodiments of the present invention provide systems and methods for selecting routes and speeds that are sensitive to both time and cost considerations.

Figure 1:
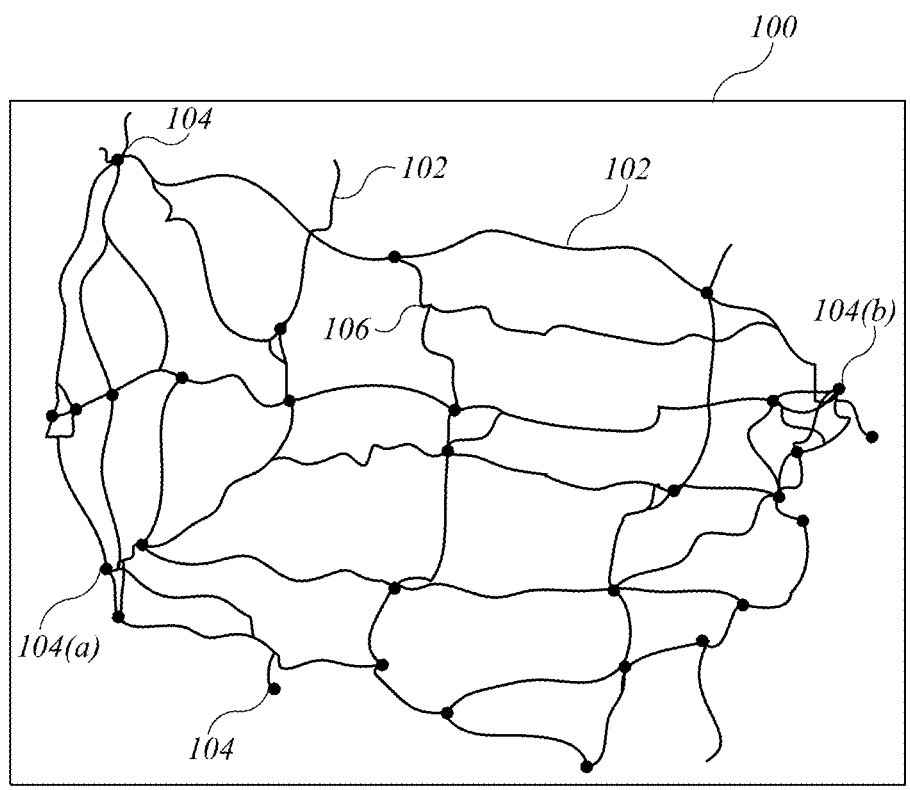
FIG. 1 shows an example of a map of a highway system on which trucks may operate.

By way of introducing the route-planning problem, FIG. 1 shows an example of a map 100 of a highway system on which trucks may operate. Highways are shown as lines 102, and cities are shown as dots 104. It should be noted that some highways may intersect away from cities, e.g., at 106, and multiple highways may intersect within a city. As can be seen, there may be multiple possible routes from one city (e.g., city 104a) to another city (e.g., city 104b). The shortest route might be easily determined (e.g., by consulting map 100); however, the shortest route is not necessarily optimal in terms of the cost of operating the truck. For instance, due to conditions of the road surface, grade, or the like, the fuel cost may be higher for the shortest route than for a longer route. Further, fuel consumption depends significantly on speed of the truck, and different routes may require traveling at different speeds to reach the destination in time. Such tradeoffs cannot be evaluated simply by consulting map 100. In addition, real-world highway networks tend to be considerably more complicated than map 100, with thousands of possible routes. Thus, determining an optimum travel plan (route and speed) is in general a highly complex problem.

Accordingly, some embodiments of the present invention provide methods and systems to automatically determine an optimal route and speed for a specified truck carrying a specified weight of freight from a specified source location (e.g., where the freight is to be loaded onto the truck) to a specified destination location (e.g., where the freight is to be delivered by the truck). The route and speed can be optimized to minimize fuel consumption (and optionally other operating costs) subject to the requirement that the truck reaches the destination by a specified deadline.

Figure 2:
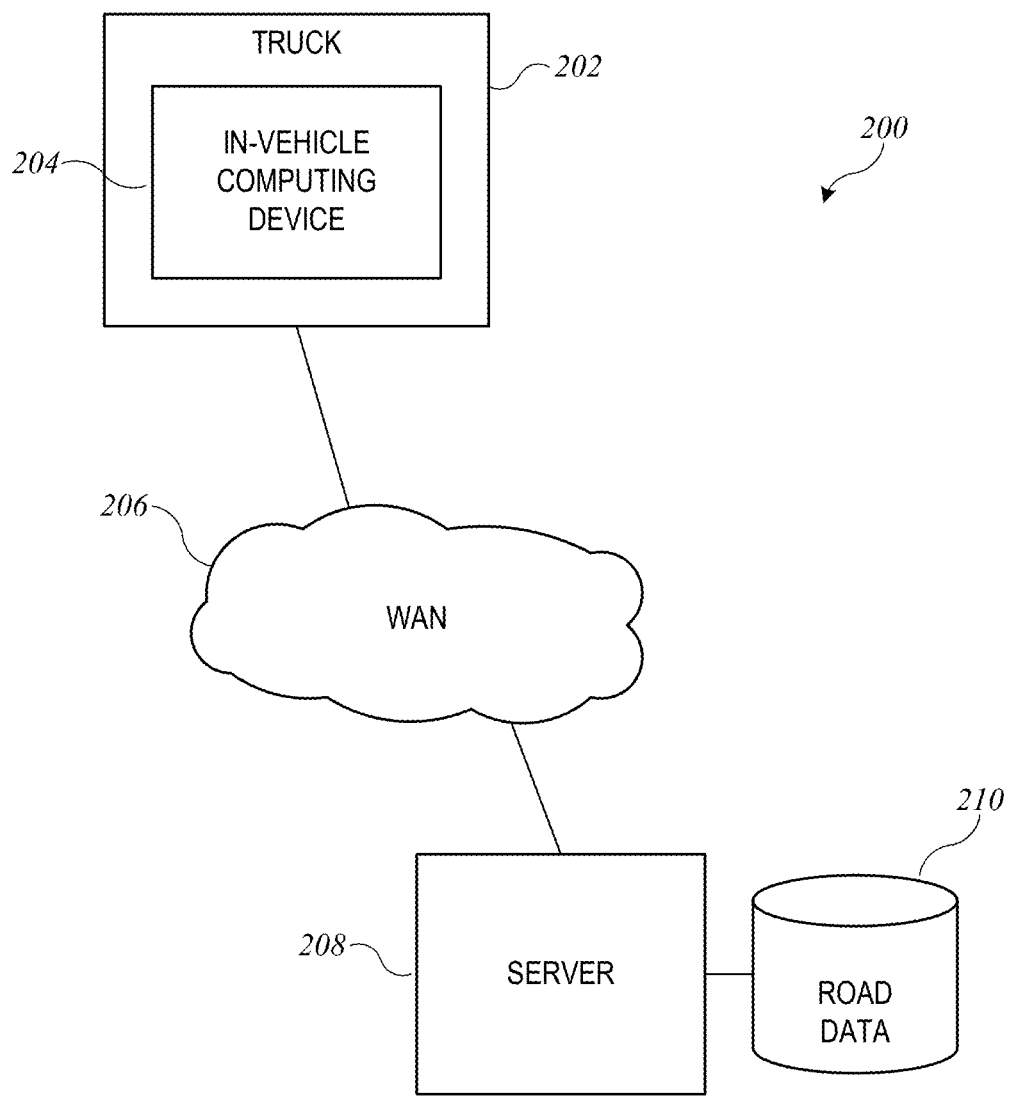
FIG. 2 is a simplified block diagram showing a system for determining an optimal route for a truck according to an embodiment of the present invention.

FIG. 2 is a simplified block diagram showing a system 200 for determining an optimal route and speed for a truck according to an embodiment of the present invention. System 200 includes one or more trucks 202, each of which may have an in-vehicle computing device 204. The in-vehicle computing device 204 can be a user-operable computing device that is permanently installed in the truck or that can be placed in the truck by an operator while operating the truck. Examples of the latter include a mobile phone, a tablet computer, a laptop computer, a GNSS navigation device that receives signals from a global navigation satellite system, and so on. In some embodiments, in-vehicle computing device 204 includes a user interface that allows an operator to enter information and to view information generated or obtained by in-vehicle computing device 204. In-vehicle computing device 204 is communicably coupled to a wide-area network (WAN) 206 such as the Internet. In some embodiments, communication may be achieved wirelessly, e.g., using existing cellular data networks, satellite communication networks, and/or networks conforming to IEEE 802.11 family standards (such as Wi-Fi networks).

Server 208 is also communicably coupled to WAN 206 and is capable of communicating via WAN 206 with in-vehicle computing device 204. In some embodiments, server 208 includes a high-power processing subsystem (e.g., a server farm constructed using blade servers) and large-scale data storage facilities, which can be constructed using conventional components and technologies. Such storage facilities may be local to or remote from server 208 as desired. For instance, server 208 may access road data 210, which can be a database storing general information about roads in a given geographical region. Specific examples are described below.

Figure 3:
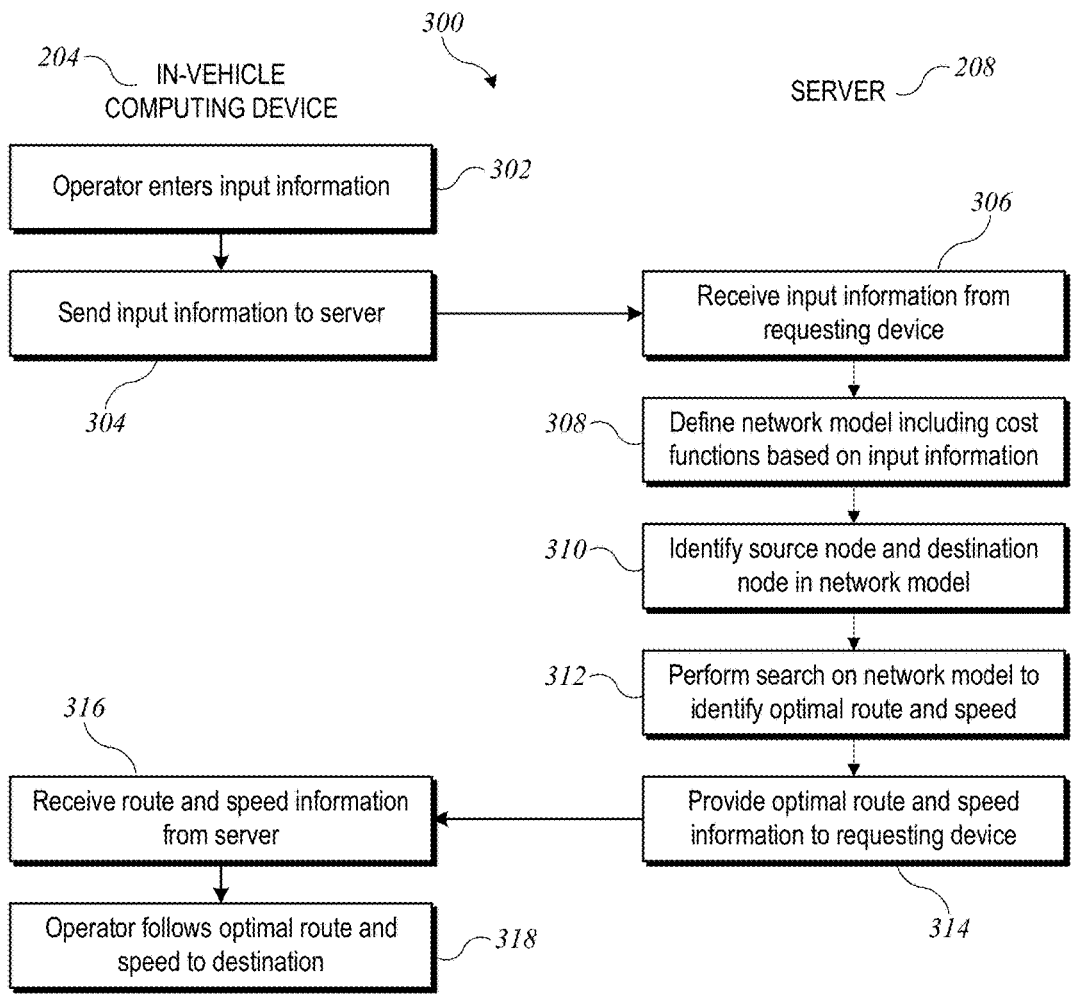
FIG. 3 is a flow diagram showing an operating process according to an embodiment of the present invention.

FIG. 3 is a flow diagram showing an operating process 300 according to an embodiment of the present invention. Process 300 may be performed, e.g., using system 200 of FIG. 2. At block 302, an operator of truck 202 may enter information about a scheduled freight run as input to in-vehicle computing device 204 such as the source location (where the freight is to be loaded onto the truck), destination location (where the freight is to be delivered from the truck), weight of the freight, and target delivery date (and time). In some embodiments, the operator may also enter information describing truck 202 (e.g., make, model); in other embodiments, in-vehicle computing device 204 may store information describing truck 202 so that the operator need not repeatedly enter this information. At block 304, in-vehicle computing device 204 sends the input information to server 208 via WAN 206, e.g., as part of a request for route guidance.

Figure 4:
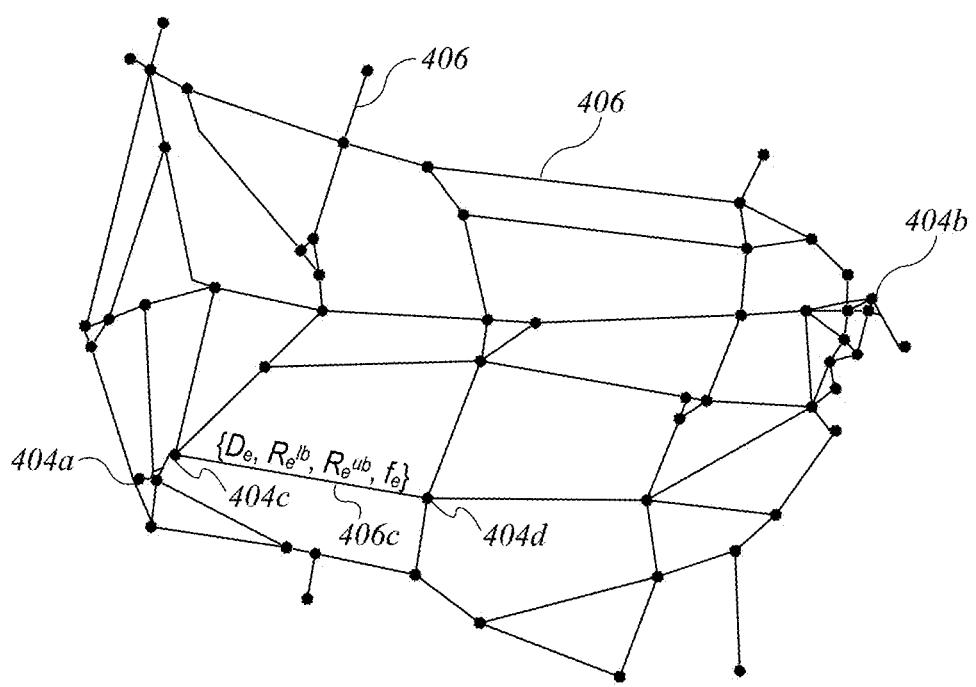
FIG. 4 shows a network model that can be constructed from the map of FIG. 1 according to an embodiment of the present invention.

At block 306, server 208 receives the input information. At block 308, server 208 defines a network model for determining an optimal route. For example, FIG. 4 shows a network model 400 that can be constructed from the map of FIG. 1 according to an embodiment of the present invention. Network model 400 consists of a set of nodes 404 and a set of edges 406. Each node 404 can correspond to a junction or endpoint of highways 102 in map 100 in FIG. 1. Nodes 404 can also be defined to correspond to other points of interest, such as locations of roadside truck stops or other rest and/or service areas, points where road characteristics (e.g., road surface, grade, speed limits) change significantly, and/or other real-world locations. Each edge 406 can correspond to a stretch of highway connecting two nodes 404. Accordingly, each node 404 is connected to at least one other node 404 by at least one edge 406. Although not shown in FIG. 4, network model 400 may provide directed edges; thus, for example, edge 406c may be understood as representing a first directed edge from node 404c to node 404d and a second directed edge from node 404d to 404c. As will become apparent, using directed edges allows network 400 to reflect the real-world property that fuel consumption when driving along a particular road from point A to point B may not be the same as fuel consumption when driving along the same road from point B to point A.

Each edge 406 can have various parameters associated with it for use in route optimization. (In the case of directed edges, each direction may have different parameter values.) For example, as shown in FIG. 4, an edge (e) may have the following associated parameters:

a distance parameter $D_e$ corresponding to the real-world distance (e.g., in miles) along the stretch of highway represented by edge e;

a minimum speed parameter $R_e^{lb}$ and a maximum speed parameter $R_e^{ub}$ corresponding to legally established or empirically determined minimum and maximum speeds (e.g., in miles per hour) along the stretch of highway represented by edge e; and a fuel-rate-speed function $f_e$ for a particular truck running on the stretch of highway represented by edge e.

In some embodiments, the fuel-rate-speed function $f_e$ for a particular truck is a function of the instantaneous speed r of the truck. This function can be modeled using a polynomial function informed by real-world data and can be assumed to be convex across the range of reasonable speeds. A specific example of generating a fuel-rate-speed function is described below. For purposes of simplifying the computational requirements, it can be assumed that a truck travels along a given edge e at a constant speed ($r_e$) and that the total fuel consumption along the edge is $f_e(r_e) \cdot \tau$, where $i=D_e/r_e$ is the total driving time for edge e.

In some embodiments, a road database defining a road network can be constructed in advance of receiving requests for route optimization. For example, nodes and edges can be defined based on a highway map or other road map that covers a region of interest. The distance parameter $D_e$ can be determined from the map, and speed parameters $R_e^{lb}$ and $R_e^{ub}$ can be determined from locally applicable traffic laws and/or observation of real-world traffic patterns for the corresponding stretch of highway. Fuel-rate-speed function $f_e$ may depend in part on the particular truck as well as the road. In some embodiments, a number of different fuel-consumption models can be defined for a given stretch of road, and a "best-fit" model can be identified for each truck type. During execution of process 300, the appropriate fuel-rate-speed function $f_e$ for the specific truck identified in the request can be selected. Alternatively, a number of different fuel-rate-speed functions $f_e$ can be defined for a truck of a given type traversing various roads, where each road is characterized by one or more of an average grade, a road surface type, and/or other road-specific parameters, and processing at block 308 can include selecting the appropriate fuel-rate-speed function $f_e$ based on road-specific parameters included in the network model.

In some embodiments where a road database is constructed in advance of receiving requests, processing at block 308 may include selecting a subset of the road database to include in the network model. For instance, a particular road database may cover a large region such as the 48 contiguous U.S. states. It may be desirable to limit the analysis for a particular request to one or more sub-regions depending on the source and destination locations. (As a simple illustration, when determining a route from Los Angeles, Calif., to Chicago, Ill., states east of Illinois might be excluded; in addition, states such as Washington or Montana that are clearly out of the way might also be excluded.)

In some embodiments, processing at block 308 can also include defining a fuel cost function for each edge e in the network model. For example, the fuel cost function can be (or can include) a fuel-time function, defined as $$c_e(t_e) = t_e \cdot f_e\left(\frac{D_e}{t_e}\right) \quad (1)$$

where $t_e$ is the time to traverse the road corresponding to edge e.

At block 310, server 208 can identify a source node and destination node in the network model. For instance, if nodes in the network model correspond to highway junctions or endpoints, server 208 can identify, as the source (destination) node, the highway junction or endpoint that is geographically closest to the starting (destination) location received at block 308. In some embodiments where a road database is used, identifying the source and destination nodes can be done as part of defining the network model.

At block 312, server 208 can perform a search on the network model to identify an optimal path and speed from the source node to the destination node. In accordance with some embodiments of the present invention, the search procedure can be optimized using a binary search algorithm applied to a dual problem space. Specific examples are described below.

At block 314, server 208 can provide optimal route and speed information to in-vehicle computing device 204. For example, based on the optimal path and speed identified at block 312, server 208 can generate a route report identifying a sequence of road segments to be driven from the starting location to the destination location and an average speed to maintain on each road segment. This report can be communicated to in-vehicle computing device 204 via WAN 206.

At block 316, in-vehicle computing device 204 can receive the optimal route and speed information and can present the information to the operator via its user interface. At block 318, the operator can follow the optimal route and speed guidance presented by in-vehicle computing device 204 to drive the truck from the starting location to the ending location.

For real-world applicability, process 300 requires a computationally feasible search algorithm. Given a simple network model (e.g., with few nodes and edges), it may be practical to identify all possible paths and speeds, compute a cost for each combination of path and speed, and compare costs across all combinations of paths and speeds. However, models corresponding to real-world highway networks typically include too many possible paths to make this a practical solution, given the immense computational resources that would be required. For instance, one realistic network model of the U.S. national highway system includes over 84,000 nodes and over 89,000 directed edges.

Accordingly, embodiments of the present invention incorporate a heuristic search algorithm to determine an optimal path through a complex network model in a computationally feasible manner. An example of a suitable heuristic search algorithm will now be described.

The path selection and speed optimization (PASO) problem for a network model can be formulated mathematically. Within the set $\mathcal{E}$ of all edges in the network model, a path can be defined. As used herein, a "path" refers to a sequence of connected edges (or path segments) that begins at the source node and ends at the destination node. For a given path, a binary function $x_e$ is defined such that $x_e=1$ for edges in the path and $x_e=0$ for edges not in the path. A vector x can be defined as $x \triangleq \{x_e : e \in \mathcal{E}\}$, and a vector t can be defined as $t \triangleq \{t_e : e \in \mathcal{E}\}$, where $t_e$ is the (variable) time required to traverse a given edge. A set $\mathcal{T}$ capturing the speed limits of all roads can be defined as:

$$\mathcal{T} \triangleq \{t : t_e^{lb} \leq t_e^{ub}, \forall e \in \mathcal{E}\}. \quad (2)$$

where $t_e^{lb} \triangleq D_e/R_e^{ub}$ and $t_e^{ub} \triangleq D_e/R_e^{lb}$ are the lower and upper bounds on the travel time $t_e$ due to the speed limits on edge e. A hard delay constraint T, representing the maximum travel time, can be defined based on the target delivery date specified in the input information. The PASO problem, then, is to find a path satisfying:

$$\min_{x \in \mathcal{X}, t \in \mathcal{T}} \sum_{e \in \mathcal{E}} x_e \cdot c_e(t_e) \quad (3)$$

where set $\mathcal{X}$ restricts that one and only one path from the source node to the destination node is chosen, subject to the constraint that:

$$\sum_{e \in \mathcal{E}} x_e t_e \leq T. \quad (4)$$

To make the PASO problem more computationally tractable for complex networks, a heuristic approach based on Lagrangian relaxation can be employed. More specifically, it is observed that the hard delay constraint of Eq. (4) couples the path selection variable x with the speed optimization variable t. This constraint can be relaxed, and a Lagrangian dual variable $\lambda \geq 0$ is introduced; the dual variable can be interpreted as a per-unit delay price over the entire network. Accordingly, the corresponding Lagrangian can be defined as:

$$L(x, t, \lambda) \triangleq \sum_{e \in \varepsilon} x_e \cdot c_e(t_e) + \lambda \left( \sum_{e \in \varepsilon} x_e t_e - T \right) \qquad (5)$$

and the corresponding dual function can be defined as $$D(\lambda) \triangleq \min_{x \in X, t \in T} L(x, t, \lambda). \qquad (6)$$

The PASO problem can accordingly be formulated in a dual problem space as finding a path that maximizes the value of the dual function:

$$\max_{\lambda \geq 0} D(\lambda). \qquad (7)$$

For purposes of finding the optimum path, a "best-response" function $t_e^*(\lambda)$ for each edge e can be defined as:

$$t_e^*(\lambda) = \begin{cases} t_e^{ub}, & 0 \leq \lambda \leq -c_e'^{-1}(t_e^{ub}) \\ c_e'^{-1}(-\lambda), & -c_e'^{-1}(t_e^{ub}) \leq \lambda \leq -c_e'^{-1}(t_e^{lb}) \\ t_e^{lb}, & \lambda > -c_e'^{-1}(t_e^{lb}) \end{cases} \qquad (8)$$

where $c'_e{}^{-1}(\bullet)$ is the inverse function of $c_e(\bullet)$ defined in Eq. (1) above.

Best-response function $t_e^*(\lambda)$ has an economic interpretation. As the hard delay constraint is relaxed, each edge is penalized with a delay cost, which is the product of the travel time $t_e$ and the per-unit delay price $\lambda$. For a given delay price $\lambda$, each edge e selects an optimal travel time that minimizes its generalized cost, including both fuel cost $c_e(t_e)$ and delay cost $\lambda \cdot t_e$. Thus, $t_e^*(\lambda)$ represents the best response of edge e for a given delay price $\lambda$.

A generalized-cost function $w_e(\lambda)$ for each edge can be defined as:

$$w_e(\lambda) \triangleq c_e(t_e^*(\lambda)) + \lambda t_e^*(\lambda) \qquad (9)$$

This function can be interpreted as the minimal generalized cost, including both fuel cost and delay cost, of edge e for a given delay price $\lambda$.

A shortest-generalized-cost path (between a fixed source node and a fixed destination node) for a given delay price can be defined as the path $p^*(\lambda)$ that satisfies:

$$\min_{x \in X} \sum_{e \in \varepsilon} x_e \cdot w_e(\lambda) \qquad (10)$$

Next, a total travel time function $\delta(\lambda)$ can be defined as:

$$\delta(\lambda) \triangleq \sum_{e \in p^*(\lambda)} t_e^*(\lambda) \qquad (11)$$

which is the total travel time of the resulting shortest-generalized-cost-path $p^*(\lambda)$ for a given $\lambda$.

It is observed that, provided that fuel-cost function $c_e(t_e)$ is convex, $\delta(\lambda)$ is non-increasing over $0 \leq \lambda \leq \infty$. Accordingly, increasing $\lambda$ decreases the total travel time of the selected path based on the best responses of all edges. Since $\lambda$ can be interpreted as a delay price, increasing $\lambda$ forces all edges to select a shorter travel time and further forces the resulting shortest-generalized-cost path $p^*(\lambda)$ to have a shorter travel time. Consequently, the simple dual variable $\lambda$ can be used to coordinate the total travel time. More specifically, if $\delta(\lambda) > T$ (i.e., if the hard delay requirement is not satisfied), increasing $\lambda$ allows ($\lambda$) to decrease to satisfy the hard delay requirement. On the other hand, if $\delta(\lambda) < T$, it is possible to decrease fuel cost by increasing the travel time (by driving more slowly); decreasing $\lambda$ allows $\delta(\lambda)$ to increase toward T.

A heuristic PASO algorithm attempts to find an optimum $\lambda(\lambda_0)$ such that $\delta(\lambda_0) = T$, while allowing for the reality that this may not always be possible since the PASO problem has combinatorial difficulty. In some embodiments, a binary search over a reasonable range of possible values for $\lambda$ is used.

Figure 5:
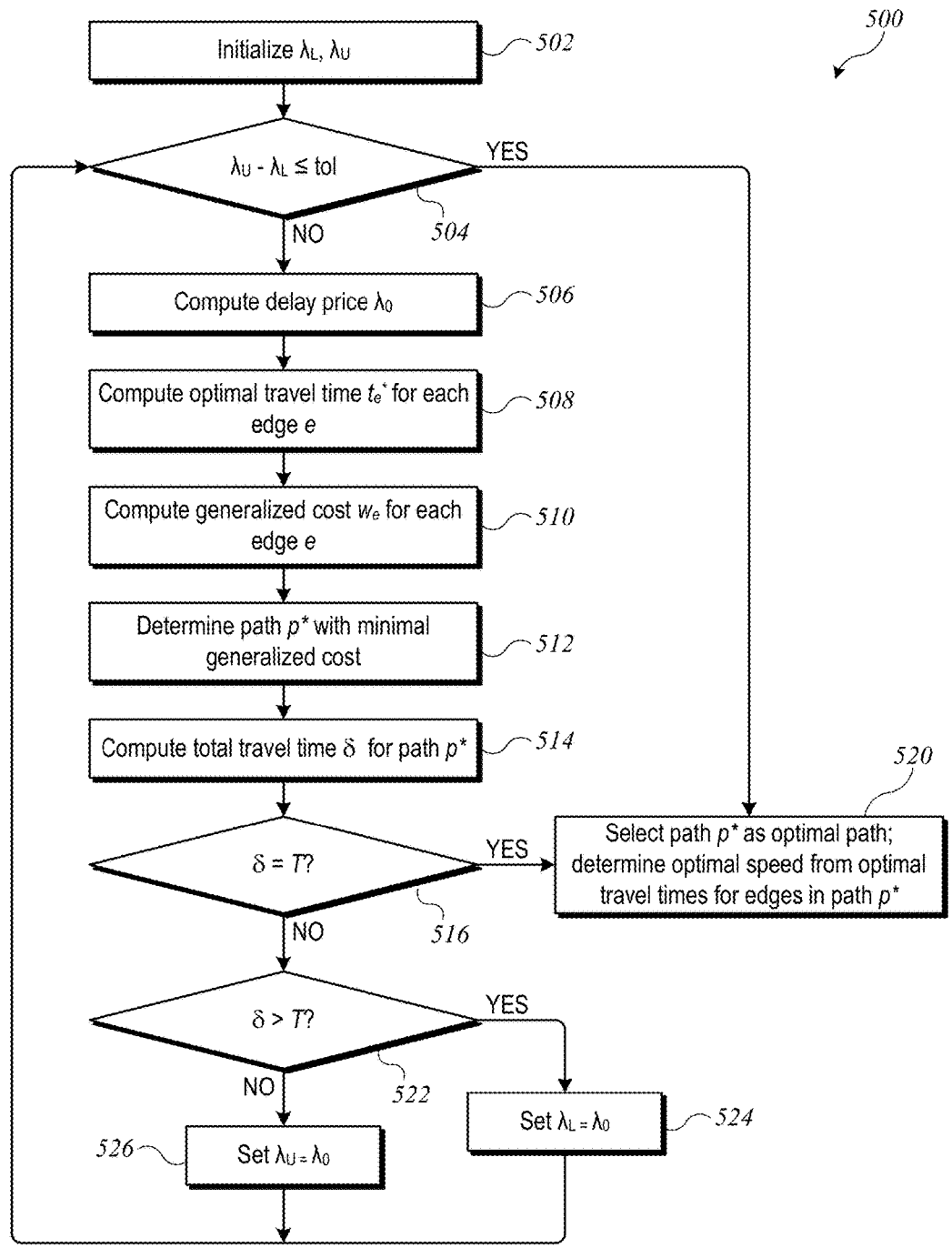
FIG. 5 is a flow diagram of a process for determining an optimal path and speed from a given source node to a given destination node in a network model according to an embodiment of the present invention.

FIG. 5 is a flow diagram of a process 500 for determining an optimal path and speed from a given source node to a given destination node in a network model according to an embodiment of the present invention. Process 500 may be used, e.g., at block 312 of process 300 described above.

At block 502, lower and upper bounds $\lambda_L$ and $\lambda_U$ for the binary search are initialized. The initial values can be chosen to cover a reasonable range of possible values. For instance, lower bound $\lambda_L$ can be initialized to 0, and upper bound $\lambda_U$ can be initialized to $\lambda_{max}$, which can be defined as an upper bound on allowable fuel consumption per unit time. In some embodiments, $\lambda_{max}$ is 100 gallons/hour; other values may be chosen. The values $\lambda_L$ and/or $\lambda_U$ are updated as the binary search loop proceeds, until such time as the upper and lower bounds converge to a sufficient degree.

The binary search loop begins at block 504, where a determination is made as to whether the difference $\lambda_U - \lambda_L$ is within a tolerance limit (tol). The tolerance limit can be a value close to zero, representing a point at which the search terminates.

Assuming that the difference is not within the tolerance limit (as would be the case initially), the binary search loop can proceed as follows. At block 506, a current delay price $\lambda_0$ is computed. For example:

$$\lambda_0 = \frac{\lambda_U + \lambda_L}{2} \qquad (12)$$

At block, 508, an optimal travel time $t_e^*(\lambda_0)$ is computed for each edge e, e.g., using Eq. (8) above.

At block 510, a generalized cost $w_e(\lambda_0)$ is computed for each edge, e.g., using Eq. (9) above.

At block 512, the generalized cost $w_e(\lambda_0)$ for each edge is used to determine the shortest-generalized-cost path $p^*(\lambda_0)$, e.g., using Eq. (10) above.

At block 514, the total travel time $\theta(p^*(\lambda_0))$ for the shortest-generalized-cost path $p^*(\lambda_0)$ is computed, e.g., using Eq. (11) above.

At block 516, a determination is made as to whether the travel time is equal to the hard delay constraint, i.e., whether $\delta(p^*(\lambda_0))=T$. If so, then the search can end. At block 520, path $p^*(\lambda_0)$ can be selected as the optimal path, and the optimal speed for each edge belonging to path $p^*(\lambda_0)$ can be determined using the best-response time $t_e^*(\lambda_0)$ associated with each edge belonging to path $p^*(\lambda_0)$.

If, at block 516, $\delta(p^*(\lambda_0))$ is not equal to T, then at block 522, a determination is made as to whether $\delta(p^*(\lambda_0)) > T$. If so, then (as noted above), $\lambda$ should be increased so as to reduce the total travel time; accordingly, at block 524, lower bound $\lambda_L$ is updated to the current delay price $\lambda_0$. If, at block 522, $\delta(p^*(\lambda_0))$ is not greater than T, then the only other possibility is $\delta(p^*(\lambda_0)) < T$. In that case, $\lambda$ should be decreased so as to allow slower driving speeds and reduced fuel costs; accordingly, at block 526, upper bound $\lambda_U$ is updated to the current delay price $\lambda_0$. In either case, process 500 returns to block 504 to continue the binary search loop. The binary search loop can be iterated until convergence is reached (block 504) or a value of $\lambda_0$ is found for which the travel time matches the delay constraint (block 516).

It is to be understood that the processes and systems described above are illustrative and that variations and modifications are possible. For example, server 208 may communicate with any number of in-vehicle computing devices 204 in any number of trucks 202. Varying amounts of manual user input may be required. In some implementations, server 208 may be operated by a dispatching service or the like, and rather than inputting information about a particular freight run, the truck operator may receive the information via server 208 along with the recommended route.

The binary search process used for path and speed optimization can also be modified. For instance, the generalized cost function described above focuses on fuel costs, but this function can be modified to take into account other real-world operating costs; examples are described below. The particular tolerance limits, initial values of $\lambda_U$ and $\lambda_L$, and other parameters may also be modified as desired.

It should also be understood that the techniques described herein can be applied to any system of roads. In some embodiments, the road network model may focus on highways where a driver can expect to travel significant distances without stopping and may omit "local" roads, such as city streets connecting a freight depot to the nearest highway, on the assumption that the fuel consumption and delay are dominated by highway travel. In some embodiments, determining the delay parameter T may include accounting for time needed to drive from the actual pickup location to the starting location (corresponding to the source node of the network model) and from the destination location (corresponding to the destination node of the network model) to the actual drop-off location. It is, however, possible to include local roads in the network model if desired, although this may increase significantly complexity. For instance, in addition to increasing the number of nodes and edges, the assumption that edges are traversed at constant speed may not apply, which complicates the fuel-cost function.

Figure 6:
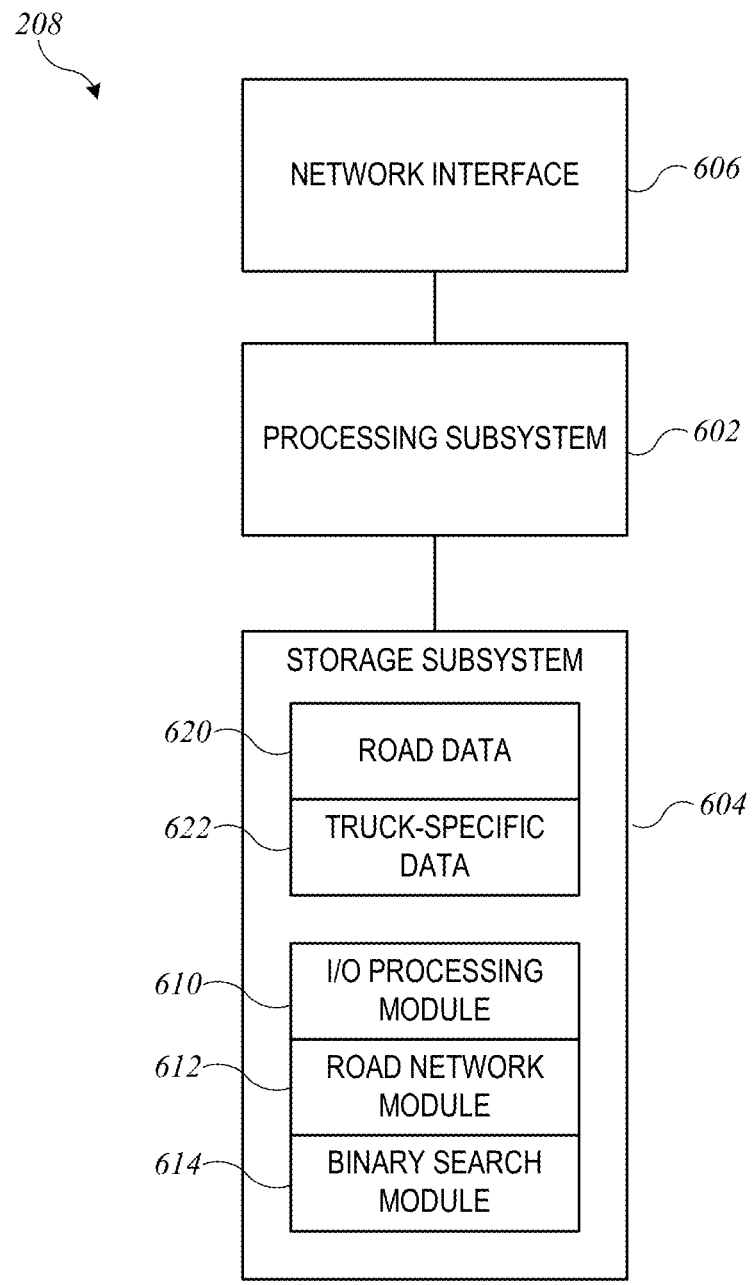
FIG. 6 is a simplified block diagram of an implementation of server according to an embodiment of the present invention.

Server 208 can be implemented using computer systems of generally conventional design, programmed to carry out operations as described herein. FIG. 6 is a simplified block diagram of an implementation of server 208 according to an embodiment of the present invention. In this implementation, server 208 includes processing subsystem 602, storage subsystem 604, and network interface 606.

Processing subsystem 602 can include one or more general purpose programmable processors capable of executing program code instructions to perform various operations, including operations described therein. In some embodiments, processing subsystem 602 may incorporate scalable processing hardware (e.g., an array of server blades or the like) that can be adapted dynamically to varying processing needs.

Storage subsystem 604 can include local and/or networked storage devices. Local storage devices may include a combination of volatile and nonvolatile storage elements (e.g., DRAM, SRAM, flash memory, magnetic disk, optical disk, etc.). Portions of the local storage devices may be used to store program code to be executed by processing subsystem 604.

Examples of program code can include an input/output (I/O) processing module 610, a road network computation module 612, and a binary search module 614. I/O processing module 610 can implement operations such as parsing of received requests for route information; activation of other code modules (e.g., road network computation module 612 and/or binary search module 614) to process received requests; and formatting of output from other code modules for transmission back to a requesting device. Road network computation module 612 can define a road network model suitable for responding to a particular request, e.g., as described above with reference to blocks 308 and 310 of process 300. Binary search module 614 can implement a binary search algorithm, e.g., as described above with reference to FIG. 5, that operates to determine an optimal path and speed through the road network model defined by road network computation module 612. In some embodiments, binary search module 614 can provide its output to I/O processing module 610 for formatting and transmission to the requesting device.

As described above, construction of a road network model may require access to a large amount of information about real-world roads and truck performance. Storage subsystem 604 can provide access to road data 620 and truck performance data 622, using any combination of local storage and/or network storage. In some embodiments, storage subsystem 604 may retrieve data from one or more remote databases and may store some or all of the retrieved data locally for use in processing operations. For example, storage subsystem 604 may obtain road-network data from a road-information dataset compiled by the Clinched Highway Mapping Project (http://cmap.m-plex.com), obtain elevation data from governmental sources such as the U.S. Geological Survey (USGS), obtain speed data from a mapping service such as the HERE open location service (http://here.com), and so on. Truck performance data 622 may be collected by an operator of server 208 (e.g., using information supplied by truck operators who use server 208, truck manufacturers, and/or simulations of truck performance) or accessed from a data store maintained by another service. In some embodiments, portions of the data stored at remote locations may be downloaded to local storage of storage subsystem 604 on an as-needed basis.

Network interface 606 can be implemented using any combination of hardware and software components that together enable communication with WAN 206. In some embodiments, network interface 606 may communicate with a local area network (LAN) using Ethernet, Wi-Fi, or other similar technologies, and the LAN may enable communication with WAN 206. Via network interface 606, server 208 can communicate with in-vehicle computing device 204 and/or with other servers that store data needed for operation of server 208 (e.g., road data and/or truck performance data).

While server 208 and its operations are described herein with reference to particular blocks, it is to be understood that these blocks are defined for convenience of description and are not intended to imply a particular physical arrangement of component parts or a particular software architecture. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including computing devices and computer systems implemented using any combination of circuitry and software.

Example

An implementation of the heuristic PASO algorithm described above has been created and tested using real-world data. For purposes of facilitating understanding, this example implementation and representative test results will now be described. It is to be understood that this example is illustrative and not limiting.

To define a road network model, model of the U.S. National Highway System (NETS) was constructed using the dataset of the Clinched National Highway Mapping Project (see http://cmap.m-plex.com). The complete network graph file consisted of 84,504 nodes and 89,119 (directed) edges. The model was augmented to incorporate grade/slope information, since the grade can have a strong effect on fuel consumption. Specifically, elevation data for the location corresponding to each node was obtained using the Elevation Point Query Service provided by the U.S. Geological Survey (USGS), and a grade was assigned to each edge based on the difference in elevation between the start and end nodes of the edge and the distance parameter of the edge. The network model was simplified by limiting to the eastern U.S. (longitude east of 100° W) and by merging non-intersection roads with similar grades into a single road. In addition, the remaining portion of the model was divided into 22 regions along lines of constant latitude and longitude, and for each region, the node closest to the geographic center was identified. These nodes were used as sources and destinations for evaluation purposes.

Speed limits were determined using data available from the HERE open location service (http://here.com). Specifically, the HERE map was queried repeatedly over a two-week period to determine current traffic speeds for various roads, and the average speed for a given road over the query period was used as the maximum speed $R_e^{ub}$ for the corresponding edge. The minimum speed $R_e^{lb}$ was set to 30 miles per hour for all edges, unless $R_e^{ub}$ was lower than 30 mph, in which case $R_e^{ub}$ was also used as $R_e^{lb}$.

Figure 7A:
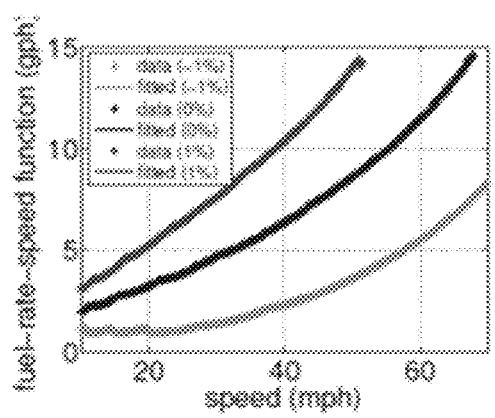
FIG. 7A is a graph showing examples of fitted fuel-rate-speed functions that can be used in some embodiments of the present invention.
Figure 7B:
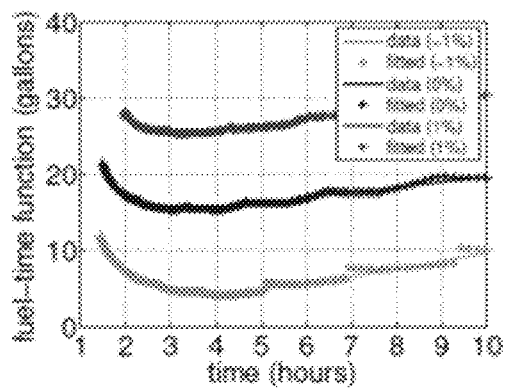
FIG. 7B is a graph showing examples of fuel cost functions corresponding to the fuel-rate-speed functions of FIG. 7A.

Fuel consumption data was obtained from the ADVISOR simulator (a community-supported project accessible at https://sourceforge.net/projects/adv-vehicle-sim/). The fuel-rate-speed function for each edge e was modeled as:

$$f_e(r)=a_{3e}r^3+a_{2e}r^2+a_{1e}r+a_{0e} \quad (13)$$

where r is the speed (in miles per hour and $f_e(r)$ is the fuel rate consumption (in gallons per hour). Coefficients $a_{3e}$, $a_{2e}$, $a_{2e}$, $a_{0e}$ were determined by running a simulation using ADVISOR for a Kenworth T800 truck with a 36-ton (full) load. A four-hour driving cycle was simulated with constant speed r and constant grade θ. The simulation was repeated for each speed r in a range from 10 mph to 70 mph (step size 0.2 mph) and for each θ in a range from -10.0% to +10.0% (step size 0.1%). For each grade, the collected set of results for different speeds r was fit to Eq. (13) using a fit function in MATLAB. By way of illustration, FIG. 7A shows examples of fitted fuel-rate-speed functions $f_e(r)$ for grades of -1.0%, 0.0%, and 1.0%. The functions have some small glitches, associated with the truck switching gears. FIG. 7B shows the corresponding $c_e(t_e)$ functions, verifying that $c_e(t_e)$ is first strictly decreasing, then strictly increasing.

Optimum routes and speeds between different source and destination nodes (defined per region, as described above) were determined using a heuristic PASO algorithm implemented according to process 500 and also using a fully polynomial time approximation scheme (FTPAS) to directly solve the PASO problem defined with reference to Eqs. (3) and (4). While the FTPAS is capable of achieving a desirable theoretical performance guarantee, it also suffers from long running time as compared to the heuristic PASO algorithm. Specifically, the FTPAS attains an approximation ratio of 1+ε with a network-size induced complexity of $O(mn^2/\epsilon^2)$, where m and n represent the number of nodes and edges, respectively. In contrast, the heuristic PASO algorithm has O(m+n log n) complexity and can be solved much faster using any given processing system.

FIG. 8 is a table 800 showing representative results for four different settings (S1-S4) using the FTPAS and a heuristic PASO algorithm according to an embodiment of the present invention. For each setting, column 804 indicates the source and destination regions, and columns 806 and 808 indicate the number of edges (n) and nodes (m) in the relevant network module. In column 810, the "instance" is a tuple representing the source node (identified by region number), destination node (also identified by region number), and delay time T (in hours). Parameter E in column 812 defines the approximation ratio for the FTPAS. Column 814 shows the fuel consumption determined using the FTPAS algorithm, and column 816 shows the fuel consumption determined using the heuristic PASO algorithm. Column 818 compares the computing-time performance (in seconds) of the FTPAS and heuristic PASO algorithms, and column 820 compares the memory usage (in GB). As the results show, the heuristic PASO algorithm gives a near-optimal solution for all cases. Further, the heuristic PASO algorithm scales better to larger networks, as can be seen by the computing time and memory usage.

To assess the effect on real-world efficiency of truck routing, the heuristic PASO algorithm was also compared with four "baseline" routing algorithms: (i) a fastest (time) path algorithm with each edge traversed at maximum speed; (ii) a fastest path algorithm with optimal speed; (iii) a shortest (distance) path algorithm with maximum speed; and (iv) a shortest path algorithm with optimal speed. A time benchmark can be established using baseline algorithm (i), and a distance benchmark can be established using baseline algorithm (iii) (or (iv)). FIG. 9 is a table 900 showing the average effect of different algorithms as compared to the benchmarks, across all instances studied. Column 902 shows the average time increase as a percentage relative to the benchmark established by algorithm (i) (fastest time). Column 904 shows the average distance increase as a percentage relative to the benchmark established by algorithm (iii) or (iv) (shortest distance). Column 906 shows the average fuel increase as a percentage relative to a benchmark established using the heuristic algorithm of process 300. Column 908 shows the average fuel economy (in miles per gallon) for each algorithm. As can be seen, the heuristic PASO algorithm can provide significantly improved fuel economy as compared to some alternative approaches. Further, even a small improvement in fuel economy may have a significant effect when applied to the commercial trucking industry.

Additional Embodiments

While the invention has been described with respect to specific embodiments, those skilled in the art will appreciate that variations and modifications are possible.

In embodiments described above, the generalized cost function takes into account fuel consumption and delay. In reality, there are other considerations related to the operation of long-haul, heavy-duty trucks. Examples of such considerations include access restrictions, usage fees (e.g., tolls), monetary and/or personal benefits associated with completing runs quickly, and regulatory considerations such as required rest periods for drivers. Some embodiments of the present invention can incorporate modifications of the generalized cost function to take such considerations into account. Examples will now be described.

Access restrictions may limit the ability of a given truck to use a particular road. For instance, some roads have weight limits. In some embodiments, the parameters associated with an edge may include the applicable weight limit for the corresponding stretch of road, and an edge can be excluded from the set of possible paths if the weight of the (loaded) truck exceeds the weight limit. Other types of access restrictions can be handled in a similar manner.

Tolls or other user fees can be represented by associating a toll parameter $P_e^{toll}$ with each edge e. In some embodiments, the toll for a particular road may be a function of truck weight and/or number of axles, and a truck-specific $P_e^{toll}$ can be defined accordingly; for non-toll roads, $P_e^{toll}=0$. The monetary cost associated with a road can be defined as $m_e(t_e) = P^{fuel} c_e(t_e) + P_e^{toll}$, where $P^{fuel}$ corresponds to the price of fuel (e.g., per gallon) and the function $m_e(t_e)$ can replace the function $c_e(t_e)$ in Eq. (3). Since $m_e(t_e)$ is still polynomial and strictly convex, a heuristic PASO algorithm as described above can be used to solve the modified PASO problem.

The advantage of completing a run quickly can also be incorporated into an edge cost function. For example, the edge cost can be modeled as $\tilde{c}_e(t_e) = c_e(t_e) + \omega t_e$, where $\omega \geq 0$ is a parameter used to balance the fuel and time costs, and the function $\tilde{c}_e(t_e)$ can replace the function $c_e(t_e)$ in Eq. (3). Again, since the function $\tilde{c}_e(t_e)$ is also polynomial and strictly convex, a heuristic PASO algorithm described above can be used to solve the modified PASO problem. In the case where $\omega=0$, $\tilde{c}_e(t_e)$ reduces to $c_e(t_e)$, and in the case where $\omega \to \infty$ (i.e., considering only the time cost), the path with the shortest travel time is the optimal path.

Regulatory considerations may also be a factor for long-haul route planning. Many countries have hours-of-service (HOS) regulations that limit driving hours for an individual truck operator. For instance, some countries require that the driver must rest for 30 minutes every 5 hours and must also stop for 10 hours of rest for every 14 hours of work. In this scenario, a path can be chosen to meet the deadline and minimize fuel consumption while also enabling the driver to satisfy the HOS regulations. One technique includes identifying certain nodes in the network model as "resting" nodes. Each resting node may correspond to a location where the driver may exit the highway and legally park to obtain the required rest; examples include cities or towns, roadside rest areas open to the public, freeway exits that have nearby truck stops, and so on. During selection of possible paths, the nonstop driving duration between nodes can be chosen to respect HOS constraints. In one approach, the optimization problem can be divided into sub-problems. For example, first, some rest nodes can be selected to form a rest-node line. Next, the total delay can be divided into all segments in the rest-node line such that the HOS constraint is satisfied for each segment. The result can be used to solve the sub-problem for each segment. In some embodiments, the selection of rest nodes and division of the total delay may be informed by real-world experience; other criteria (e.g., distance between rest nodes) may also be used.

Some embodiments described above assume that the truck can operate at any speed within the legal range. In reality, this may not be the case; for instance, traffic may limit the actual maximum speed to a lower speed than the legal limit. In some implementations, the maximum and minimum speeds for a particular edge may be determined based on historical data from observation of the corresponding stretch of road, thereby accounting for typical traffic conditions. In addition or instead, some embodiments of the present invention may provide real-time route updating using current traffic information. For example, after initially establishing an optimal route and speed, process 300 (or portions thereof) may be performed iteratively (e.g., at regular intervals) while the truck is traversing the route. Server 208 may have access to real-time traffic information (e.g., current speed of traffic on various roads). At each iteration, server 208 can use the current location of the truck as the starting location and can use the real-time traffic information to compute the maximum and/or minimum speed limits for each edge. (In some embodiments, server 208 may limit the maximum speed based on the legal limit rather than real-time traffic behavior.)

Techniques described herein can also be extended to scenarios with multiple destinations. In this case, the inputs to the search algorithm can include a set of two or more destinations, each with an individual hard delay constraint. The problem becomes optimizing the path and speed to reach each destination within the applicable hard delay constraint while minimizing overall fuel consumption. (It is noted that, if fuel consumption is ignored, this is a case of the familiar "traveling salesman" problem.) The path and speed optimization problem can be approached heuristically, by decomposing the problem into a set of sub-problems, each with one source node and one destination node and a hard delay constraint; the destination node of one sub-problem can be used as the source node for the next sub-problem. Nodes can be ordered based on the delay constraints and/or geographic proximity. Each sub-problem can then be solved using techniques described above.

In addition, in embodiments described above, it is assumed that the truck is operated by a human driver. However, autonomous driving systems are already in development, and it is contemplated that some embodiments of the present invention may be adapted for use with trucks that operate autonomously (with or without a person in the truck). Thus, all references to a "user" or "driver" or "operator" or the like should be understood as applying to both human beings and autonomous vehicle systems.

It should also be understood that the path and speed optimization processes described herein need not be performed at a remote server. With present technology, a server may be preferred because server systems of today provide more computing power and better ability to manage large data sets (e.g., a road network model) than portable devices of the type commonly used or installed in vehicles. However, depending on available computing power and network bandwidth, it may be practical to execute path and speed optimization using an in-vehicle computing device rather than using a remote server system.

Further, while embodiments described above make specific reference to trucks, it is to be understood that similar techniques may be applied to routing of other types of vehicles, including land-based vehicles, aerial vehicles that traverse designated air routes, seafaring vessels that traverse designated shipping lanes, and so on.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for determining a route for a truck, the method comprising:
   receiving, at a computer system, input information indicating a starting location, a destination location, a deadline, truck information, and weight;
   defining, at a computer system, a road network model, the road network model including a plurality of nodes and a plurality of edges connecting pairs of the nodes, wherein each edge corresponds to a road and has a generalized cost function associated therewith, the generalized cost function depending in part on a speed-dependent fuel consumption model associated with the truck information and in part on a speed-dependent delay time associated with the edge, wherein the generalized cost function for each edge is determined based at least in part on a fuel-rate-speed function derived from a characteristic of the corresponding road and the speed-dependent fuel consumption model associated with the truck information;
   identifying, by the computer system, a source node of the road network model that corresponds to the starting location and a destination node of the road network model that corresponds to the destination location;
   performing, by the computer system, a binary search in a dual problem space to find an optimal path and speed though the road network model from the source node to the destination node, wherein each path and speed has a cost determined from the generalized cost functions of the edges included in the path and wherein the optimal path and speed has a lowest cost subject to a constraint based on arriving at the destination node by the deadline;
   identifying, by the computer system, an optimal route and speed for the truck based on the binary search; and
   providing, by the computer system, the optimal route and speed to a user.

2. The method of claim 1 wherein the input information is received from an in-vehicle computing device communicatively coupled to the computer system by a wide-area network.

3. The method of claim 2 wherein providing the optimal route and speed to the user includes transmitting a report specifying the optimal route and speed to the in-vehicle computing device.

4. The method of claim 1 wherein the user drives the truck in accordance with the optimal route and speed from the starting location to the destination location.

5. A method for determining a route for a truck, the method comprising:
   receiving, at a computer system, input information indicating a starting location, a destination location, a deadline, truck information, and weight;
   defining, at a computer system, a road network model, the road network model including a plurality of nodes and a plurality of edges connecting pairs of the nodes, wherein each edge corresponds to a road and has a generalized cost function associated therewith, the generalized cost function depending in part on a speed-dependent fuel consumption model associated with the truck information and in part on a speed-dependent delay time associated with the edge;
   identifying, by the computer system, a source node of the road network model that corresponds to the starting location and a destination node of the road network model that corresponds to the destination location;
   performing, by the computer system, a binary search in a dual problem space to find an optimal path and speed though the road network model from the source node to the destination node, wherein each path and speed has a cost determined from the generalized cost functions of the edges included in the path and wherein the optimal route has a lowest cost subject to a constraint based on arriving at the destination node by the deadline,
   wherein performing the binary search in the dual problem space includes:
      selecting a current value $\lambda_0$ for a dual variable $\lambda$ that represents a per-unit delay price over the road network model;
      computing an optimal travel time $t_e^*(\lambda_0)$ for each of the plurality of edges, wherein the optimal travel time $t_e^*(\lambda_0)$ represents an optimal travel time for the edge given the current value $\lambda_0$;
      computing the generalized cost function $w_e(\lambda_0)$ for each of the plurality of edges, wherein the generalized cost function $w_e(\lambda_0)$ includes a fuel cost associated with the optimal travel time $t_e^*(\lambda_0)$ and a delay cost associated with the optimal travel time $t_e^*(\lambda_0)$;
      determining, using the generalized cost functions $w_e(\lambda_0)$ for the plurality of edges, a path $p^*(\lambda_0)$ that has a minimum total generalized cost function;

computing a total travel time $\delta(\lambda_0)$ for the path $p^*(\lambda_0)$; and determining, based on the total travel time $\delta(\lambda_0)$, whether to accept the path $p^*(\lambda_0)$ as an optimal path or to select a new value for the dual variable $\lambda$ and continue the binary search;

identifying, by the computer system, an optimal route and speed for the truck based on the binary search; and providing, by the computer system, the optimal route and speed to a user.

6. The method of claim 5 wherein the current value $\lambda_0$ is selected by computing an average of an upper bound $\lambda_U$ and a lower bound $\lambda_L$ on the dual variable $\lambda$.

7. The method of claim 6 wherein performing the binary search in the dual problem space further includes, in response to determining to select a new value for the dual variable $\lambda$ and continue the binary search:

setting the lower bound $\lambda_L$ equal to the current value $\lambda_0$ in the event that the total travel time $\delta(\lambda_0)$ exceeds a hard delay constraint; and setting the upper bound $\lambda_U$ equal to the current value $\lambda_0$ in the event that the total travel time $\delta(\lambda_0)$ is less than the hard delay constraint.

8. A system for determining a route for a truck, the system comprising:

a network interface configured to communicate with an in-vehicle computing device of a truck; and a processing subsystem coupled to the network interface, the processing subsystem configured to execute program code to:

receive, from the in-vehicle computing device, input information indicating a starting location, a destination location, a deadline, truck information, and weight;

define a road network model, the road network model including a plurality of nodes and a plurality of edges connecting pairs of the nodes, wherein each edge corresponds to a road and has a generalized cost function associated therewith, the generalized cost function depending in part on a speed-dependent fuel consumption model associated with the truck information and in part on a speed-dependent delay time associated with the edge;

identify a source node of the road network model that corresponds to the starting location and a destination node of the road network model that corresponds to the destination location;

perform a binary search in a dual problem space to find an optimal path and speed though the road network model from the source node to the destination node, wherein each path and speed has a cost determined from the generalized cost functions of the edges included in the path and wherein the optimal path has a lowest cost subject to a constraint based on arriving at the destination node by the deadline, wherein performing the binary search in the dual problem space includes:

selecting a current value $\lambda_0$ for a dual variable $\lambda$ that represents a per-unit delay price over the road network model;

computing an optimal travel time $t_e^*(\lambda_0)$ for each of the plurality of edges, wherein the optimal travel time $t_e^*(\lambda_0)$ represents an optimal travel time for the edge given the current value $\lambda_0$;

computing the generalized cost function $w_e(\lambda_0)$ for each of the plurality of edges, wherein the generalized cost function $w_e(\lambda_0)$ includes a fuel cost associated with the optimal travel time $t_e^*(\lambda_0)$ and a delay cost associated with the optimal travel time $t_e^*(\lambda_0)$;

determining, using the generalized cost functions $w_e(\lambda_0)$ for the plurality of edges, a path $p^*(\lambda_0)$ that has a minimum total generalized cost function;

computing a total travel time $\delta(\lambda_0)$ for the path $p^*(\lambda_0)$; and determining, based on the total travel time $\delta(\lambda_0)$, whether to accept $p^*(\lambda_0)$ as an optimal path or to select a new value for the dual variable $\lambda$ and continue the binary search;

identify an optimal route and speed for the truck based on the binary search; and provide the optimal route and speed to the in-vehicle computing device.

9. The system of claim 8 wherein an operator of the truck follows the optimal route and speed to the destination location.

10. The system of claim 8 wherein the processing subsystem is further configured such that the generalized cost function for each edge is determined based at least in part on a fuel-rate-speed function derived from a characteristic of the corresponding road and the speed-dependent fuel consumption model associated with the truck information.

11. The system of claim 10 wherein the processing subsystem is further configured such that the generalized cost function for each edge also includes a term reflecting a user fee for driving the truck on the corresponding road.

12. The system of claim 8 wherein the processing subsystem is further configured such that the current value $\lambda_0$ is selected by computing an average of an upper bound $\lambda_U$ and a lower bound $\lambda_L$ on the dual variable $\lambda$.

13. The system of claim 12 wherein the processing subsystem is further configured such that performing the binary search in the dual problem space further includes, in response to determining to select a new value for the dual variable $\lambda$ and continue the binary search:

setting the lower bound $\lambda_L$ equal to the current value $\lambda_0$ in the event that the total travel time $\delta(\lambda_0)$ exceeds a hard delay constraint; and setting the upper bound $\lambda_U$ equal to the current value $\lambda_0$ in the event that the total travel time $\delta(\lambda_0)$ is less than the hard delay constraint.

14. A non-transitory computer-readable storage medium having stored therein program code instructions that, when executed by a processing subsystem of a computer system, cause the processing subsystem to execute a method comprising:

receiving input information indicating a starting location for a truck, a destination location for the truck, a deadline, truck information for the truck, and weight;

defining a road network model, the road network model including a plurality of nodes and a plurality of edges connecting pairs of the nodes, wherein each edge corresponds to a road and has a generalized cost function associated therewith, the generalized cost function depending in part on a speed-dependent fuel consumption model associated with the truck information and in part on a speed-dependent delay time associated with the edge;

identifying a source node of the road network model that corresponds to the starting location and a destination node of the road network model that corresponds to the destination location;

performing a binary search in a dual problem space to find an optimal path and speed though the road network model from the source node to the destination node, wherein each path and speed has a cost determined from the generalized cost functions of the edges included in the path and wherein the optimal route has a lowest cost subject to a constraint based on arriving at the destination node by the deadline, wherein performing the binary search in the dual problem space includes:

selecting a current value $\lambda_0$ for a dual variable $\lambda$ that represents a per-unit delay price over the road network model, wherein the current value $\lambda_0$ is selected by computing an average of an upper bound $\lambda_U$ and a lower bound $\lambda_L$ on the dual variable $\lambda$;

computing an optimal travel time $t_e^*(\lambda_0)$ for each of the plurality of edges, wherein the optimal travel time $t_e^*(\lambda_0)$ represents an optimal travel time for the edge given the current value $\lambda_0$;

computing the generalized cost function $w_e(\lambda_0)$ for each of the plurality of edges, wherein the generalized cost function $w_e(\lambda_0)$ includes a fuel cost associated with the optimal travel time $t_e^*(\lambda_0)$ and a delay cost associated with the optimal travel time $t_e^*(\lambda_0)$;

determining, using the generalized cost functions $w_e(\lambda_0)$ for the plurality of edges, a path $p^*(\lambda_0)$ that has a minimum total generalized cost function;

computing a total travel time $\delta(\lambda_0)$ for the path $p^*(\lambda_0)$;

determining, based on the total travel time $\delta(\lambda_0)$, whether to accept $p^*(\lambda_0)$ as an optimal path or to select a new value for the dual variable $\lambda$ and continue the binary search; and in response to determining to select a new value for the dual variable $\lambda$ and continue the binary search:

setting the lower bound $\lambda_L$ equal to the current value $\lambda_0$ in the event that the total travel time $\delta(\lambda_0)$ exceeds a hard delay constraint; and setting the upper bound $\lambda_U$ equal to the current value $\lambda_0$ in the event that the total travel time $\delta(\lambda_0)$ is less than the hard delay constraint;

identifying an optimal route and speed for the truck based on the binary search; and providing the optimal route and speed to a user.

15. The non-transitory computer-readable storage medium of claim 14 wherein the input information is received from an in-vehicle computing device communicatively coupled to the computer system by a wide-area network and wherein providing the optimal route and speed to the user includes transmitting a report specifying the optimal route and speed to the in-vehicle computing device.

16. The non-transitory computer-readable storage medium of claim 14 wherein the user drives the truck in accordance with the optimal route and speed from the starting location to the destination location.

17. The non-transitory computer-readable storage medium of claim 14 wherein the generalized cost function for each edge is determined based at least in part on a fuel-rate-speed function derived from a characteristic of the corresponding road and the speed-dependent fuel consumption model associated with the truck information.

* * * * *